(12) United States Patent
Chen

(10) Patent No.: US 12,627,652 B2
(45) Date of Patent: May 12, 2026

(54) ON DEMAND TOKENIZATION PROCESSING

(71) Applicant: Visa International Service Association, San Francisco, CA (US)

(72) Inventor: Yuexi Chen, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/759,433

(22) Filed: Jun. 28, 2024

(65) Prior Publication Data

US 2026/0006023 A1 Jan. 1, 2026

(51) Int. Cl.
H04L 29/00 (2006.01)
H04L 9/40 (2022.01)

(52) U.S. Cl.
CPC .................................. H04L 63/083 (2013.01)

(58) Field of Classification Search
CPC ...................................................... H04L 63/083
See application file for complete search history.

(56) References Cited

U.S. PATENT DOCUMENTS

| | | | | |
|---|---|---|---|---|
| 6,163,771 A * | 12/2000 | Walker | .................... | G06Q 40/02 |
| | | | | 705/18 |
| 6,327,578 B1 * | 12/2001 | Linehan | .................. | G06Q 20/02 |
| | | | | 713/172 |
| 7,249,097 B2 * | 7/2007 | Hutchison | ............ | G06Q 20/102 |
| | | | | 705/79 |

| | | | | |
|---|---|---|---|---|
| 8,543,829 B2 * | 9/2013 | von Krogh | ........... | H04L 9/3228 |
| | | | | 713/185 |
| 8,965,811 B2 * | 2/2015 | Wankmueller | ......... | G06Q 20/34 |
| | | | | 705/64 |
| 9,996,835 B2 | 6/2018 | Dill et al. | | |
| 10,558,969 B2 * | 2/2020 | Prakash | ............... | G06Q 20/047 |
| 11,469,895 B2 * | 10/2022 | Shankar | ................ | H04L 9/3213 |
| 12,003,640 B2 * | 6/2024 | Tomar | .............. | G06Q 20/38215 |
| 12,413,580 B2 * | 9/2025 | Thampi | .................. | H04L 63/083 |
| 2001/0045451 A1 * | 11/2001 | Tan | ......................... | G06Q 20/12 |
| | | | | 235/375 |

(Continued)

OTHER PUBLICATIONS

Application No. EP25185749.6, Extended European Search Report, Mailed on Oct. 30, 2025, 12 pages.

*Primary Examiner* — Don G Zhao
(74) *Attorney, Agent, or Firm* — Kilpatrick Townsend & Stockton LLP

(57) ABSTRACT

One embodiment is related to a method. The method includes receiving from a storage application server computer, a token request message comprising a user identifier associated with a storage application on a user device, and determining a token. The token is a limited use token. The method includes mapping the token to the user identifier, transmitting, a token response message comprising the token to the storage application server computer. The method includes receiving from a processing network computer, a de-tokenization request message comprising the token, after the processing network computer receives an authorization request message comprising the token from a resource provider computer via a transport computer. The method also includes determining the user identifier using the token, and transmitting the user identifier to the processing network computer.

20 Claims, 7 Drawing Sheets

(56) References Cited

U.S. PATENT DOCUMENTS

| | | | | |
|---|---|---|---|---|
| 2010/0088237 | A1* | 4/2010 | Wankmueller | G06Q 20/382 |
| | | | | 705/64 |
| 2012/0030047 | A1 | 2/2012 | Fuentes et al. | |
| 2014/0164243 | A1* | 6/2014 | Aabye | G06Q 20/20 |
| | | | | 705/44 |
| 2015/0195268 | A1* | 7/2015 | Fang | H04L 9/3213 |
| | | | | 726/9 |
| 2015/0350186 | A1* | 12/2015 | Chan | H04L 63/0815 |
| | | | | 726/9 |
| 2015/0371229 | A1* | 12/2015 | Prakash | G06Q 20/047 |
| | | | | 705/44 |
| 2017/0286958 | A1* | 10/2017 | Herman | G06Q 20/3821 |
| 2017/0352034 | A1* | 12/2017 | Yu | G06Q 20/0855 |
| 2018/0316668 | A1* | 11/2018 | Yasarapu | G06Q 50/265 |
| 2019/0356489 | A1 | 11/2019 | Palanisamy | |
| 2020/0052897 | A1* | 2/2020 | Girish | H04L 9/3271 |
| 2021/0067316 | A1* | 3/2021 | Bellenger | H04L 63/06 |
| 2025/0337736 | A1* | 10/2025 | Drechsler | G06Q 20/3821 |

* cited by examiner

ON DEMAND TOKENIZATION PROCESSING

CROSS-REFERENCE TO RELATED APPLICATIONS

None.

BACKGROUND

Interaction processing systems can vary based on factors such as region and available technology. For example, in a first country, a first interaction application may be very commonly used to process interactions while a second interaction application is most commonly used in a second country to process interactions. However, different interaction applications may be incompatible. If a sender wishes to send funds to a receiver using a digital wallet application, both parties may first need to download and register with the same digital wallet application. Also, if the sender does not have available funds in the account associated with the digital wallet application, but has available funds in another account (e.g., issuer bank account), the sender must transfer funds from the other account to the digital wallet application account prior to transferring funds to the receiver using the digital wallet. Such actions are inconvenient and use computer resources and processing time.

Data security is also an issue when a user performs interactions with credentials, tokens, and user identifiers, because they can be considered sensitive information. If they are obtained by hackers or eavesdroppers when they are stored or being transmitted between computers, they can be used to conduct unauthorized transactions.

Embodiments of the disclosure address these and other problems, individually and collectively.

SUMMARY

One embodiment is related to a computer-implemented method comprising: receiving, by a token service computer from a storage application server computer, a token request message comprising a user identifier associated with a storage application on a user device; determining, by the token service computer, a token, wherein the token is a limited use token; mapping, by the token service computer, the token to the user identifier; transmitting, by the token service computer, a token response message comprising the token to the storage application server computer, which provides the token to the storage application on the user device; receiving, by the token service computer from a processing network computer, a de-tokenization request message comprising the token, after the processing network computer receives an authorization request message comprising the token from a resource provider computer via a transport computer; determining, by the token service computer, the user identifier using the token; and transmitting, by the token service computer, the user identifier to the processing network computer, wherein the processing network computer transforms the authorization request message and sends the transformed authorization request message to the storage application server computer for authorization.

Another embodiment is related to a computer-implemented method comprising receiving, by a token service computer from a service provider computer, a temporary user identifier request message comprising a token or a credential associated with a service provider application on a user device; determining, by the token service computer, a temporary user identifier, the token to the temporary user identifier; transmitting, by the token service computer, a temporary user identifier response message comprising the temporary user identifier to (i) the service provider computer, which provides the temporary user identifier to the service provider application on the user device or (ii) a storage application server computer; receiving, by the token service computer from a processing network computer, a temporary user identifier resolve request message comprising the temporary user identifier, after the processing network computer receives an authorization request message comprising the temporary user identifier from the user device via the storage application computer; determining, by the token service computer, the token or credential using the temporary user identifier; and transmitting, by the token service computer, the token or the credential to the processing network computer, wherein the processing network computer transforms the authorization request message and sends the transformed authorization request message to an authorizing entity computer for authorization.

Another embodiment of the invention can include a token service computer comprising a processor, and a computer readable medium. The computer readable medium comprises code, executable by the processor, to perform the above methods.

Further details regarding embodiments of the disclosure can be found in the Detailed Description and the Figures.

TERMS

Figure 1:
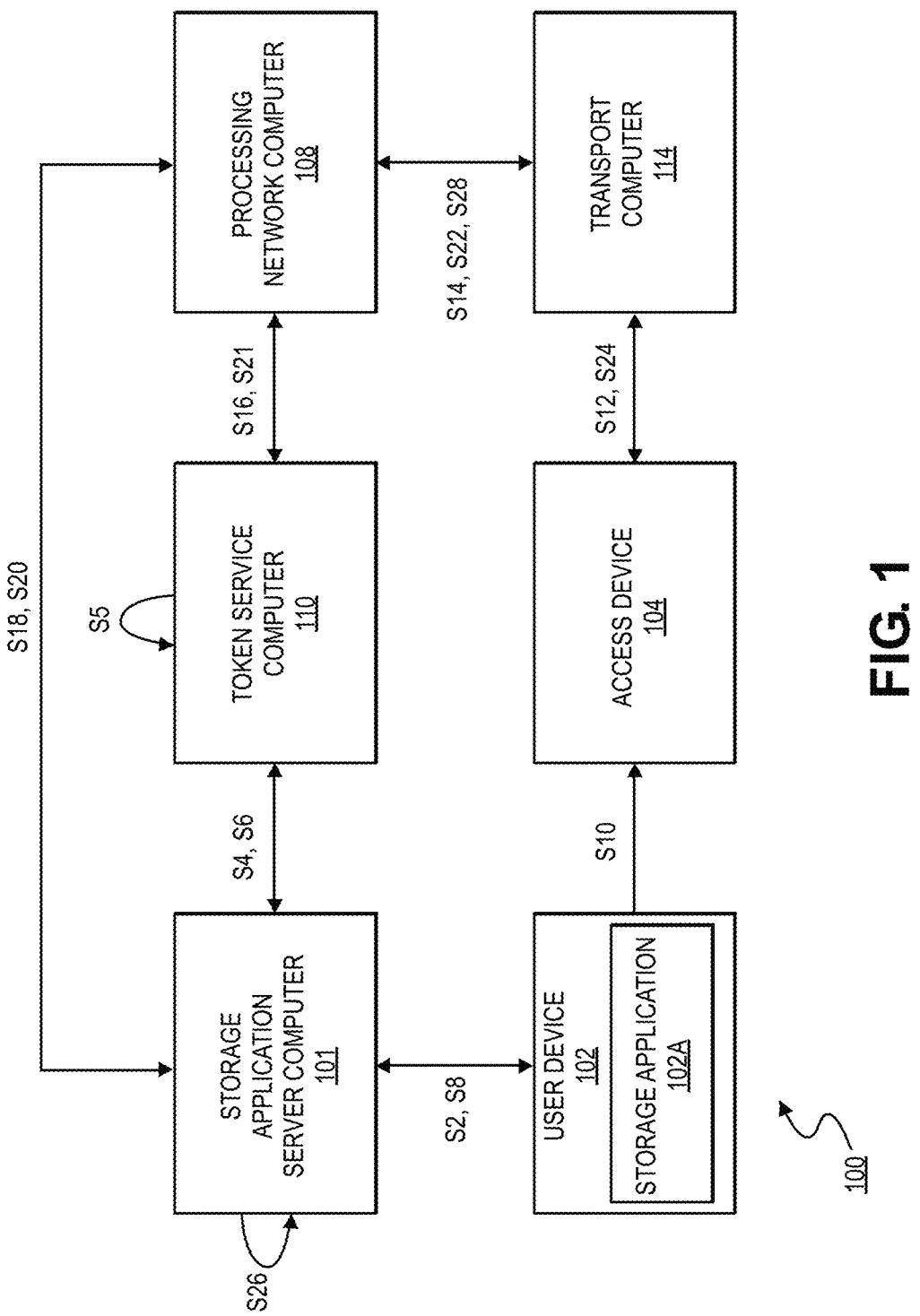
FIG. 1 shows a block diagram of a method and system for processing an interaction using a limited use token according to some embodiments.

Prior to discussing embodiments of the disclosure, some terms can be described in further detail.

A "user" may include an individual. In some embodiments, a user may be associated with one or more personal accounts and/or mobile devices. The user may also be referred to as a cardholder, account holder, or consumer in some embodiments.

A "user device" may be a device that is operated by a user. Examples of user devices may include a mobile phone, a smart phone, a card, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

An "access device" may be any suitable device for providing access to an external computer system. An access device may be in any suitable form. Some examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a portable communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a portable communication device.

A "resource provider" may be an entity that can provide a resource such as goods, services, information, and/or access. Examples of resource providers includes merchants, data providers, transit agencies, governmental entities, venue and dwelling operators, etc. A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer."

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

A "user identifier" can include any piece of data that can identify a user. A user identifier can comprise any suitable alphanumeric string of characters. In some embodiments, the user identifier may be derived from user identifying information. In some embodiments, a user identifier can include an account identifier associated with the user. For example, a user can be associated with an account, which has an account identifier, maintained by an authorizing entity computer. Examples of user identifiers can include e-mail addresses, phone numbers, identification numbers, usernames, etc.

A "token" may be a substitute value for a credential. A token may be a string of numbers, letters, or any other suitable characters. Examples of tokens include payment tokens, access tokens, personal identification tokens, etc.

"Tokenization" is a process by which data is replaced with substitute data. For example, a payment account identifier (e.g., a primary account number (PAN)) may be tokenized by replacing the primary account identifier with a substitute number (e.g., a token) that may be associated with the payment account identifier. Further, tokenization may be applied to any other information that may be replaced with a substitute value (i.e., token). Tokenization enhances transaction efficiency and security.

A "cryptogram" may include a piece of obscured text such as encrypted text. A cryptogram may be formed by encrypting input data with an encryption key such as a symmetric encryption key. In some embodiments, a cryptogram is reversible so that the inputs that are used to form the cryptogram can be obtained using the same symmetric key to perform a decryption process. In some embodiments, if input data is encrypted using a private key of a public/private key pair, the cryptogram may also be a digital signature. A digital signature may be verified with a public key of the public/private key pair. In some embodiments, a cryptogram may include a dCVV (dynamic card verification value).

In some embodiments, the cryptogram can encode data elements including an account identifier such as primary account number, a variable data element such as a counter, a time of day, or interaction value, and other information. Such data may be included using an encryption process such as DES, triple DES, or AES using suitable encryption keys. The encryption keys may also be UDKs or unique derived keys, and may be generated based upon device specific information such as an account number, which may be encrypted using a master derivation key (MDK). The cryptogram can be verified by another computer such a remote computer by either decrypting the cryptogram to and verifying the decrypted contents with other data (e.g., an account number stored on file), or by encrypting other inputs and then comparing the encrypted result to the cryptogram.

A "token request message" may be an electronic message for requesting a token. A token request message may include information usable for identifying a payment account or digital wallet, and/or information for generating a token. For example, a token request message may include payment credentials, mobile communication device identification information (e.g., a phone number or MSISDN), a digital wallet identifier, information identifying a tokenization service provider, a merchant identifier, a cryptogram, and/or any other suitable information. Information included in a token request message can be encrypted (e.g., with an issuer-specific key). In some embodiments, the token request message may include a flag or other indicator specifying that the message is a token request message.

A "token response message" may be a message that responds to a token request. A token response message may include an indication that a token request was approved or denied. A token response message may also include a token, mobile communication device identification information (e.g., a phone number or MSISDN), a digital wallet identifier, information identifying a tokenization service provider, a merchant identifier, a cryptogram, and/or any other suitable information. Information included in a token response message can be encrypted (e.g., with an issuer-specific key). In some embodiments, the token response message may include a flag or other indicator specifying that the message is a token response message.

A "detokenization request message" may include any message that requests de-tokenization of a token from a processor associated with the token. For example, a de-tokenization request message may be sent by a system (e.g., a server computer) to de-tokenize a token when the system does not have access to the tokenization algorithm or tokenization scheme of the processor or otherwise does not recognize the token. In such cases, the system may request the token be de-tokenized such that the underlying credential may be determined.

A "detokenization response message" may include any message that is sent in response to the de-tokenization request message. For example, the de-tokenization response message may include the credential associated with the token that was included in the de-tokenization request message. Additionally, if a processor does not recognize or cannot otherwise determine credential associated with the payment token, the de-tokenization response message may include an error message, unknown token message, or other information to inform a system that the token cannot be de-tokenized.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers.

An "authorization request message" may be an electronic message that requests authorization for an interaction. In some embodiments, it is sent to a transaction processing computer and/or an issuer of a payment card to request authorization for a transaction. An authorization request message according to some embodiments may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a username, an expiration date, etc. An authorization request message may also comprise "transaction information," such as any information associated with a current transaction, such as the transaction value, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request message. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

An "authorizing entity" may be an entity that authorizes a request. Examples of an authorizing entity may be an issuer, a governmental agency, a document repository, an access administrator, etc. An authorizing entity may operate an authorizing entity computer. An "issuer" may refer to a business entity (e.g., a bank) that issues and optionally maintains an account for a user. An issuer may also issue payment credentials stored on a user device, such as a cellular telephone, smart card, tablet, or laptop to the consumer, or in some embodiments, a portable device.

A "digital wallet" can include a software-based system that allows an individual to conduct electronic interactions. A digital wallet may store user profile information, credentials, account information, one or more digital wallet identifiers, one or more tokens specific to the individual and/or electronic device, one or more token authentication cryptograms (TACs) specific to the individual and/or the electronic device, and/or the like and can be used in a variety of interactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. A digital wallet may allow the user to load one or more payment cards onto the digital wallet so as to make a payment without having to enter an account number or present a physical card.

A "service provider application" may include an application maintained and operated by an entity that provides a service (e.g., a digital wallet) to a user. In some embodiments, a service provider application may be a "digital wallet application." A service provider application may store account numbers, or representations of the account numbers (e.g., token(s)), on behalf of a user to facilitate interactions at more than one unrelated entity (e.g., resource providers), perform person-to-person interactions, or transaction amount loads.

A "storage application" can be an application that stores data. In some embodiments, a storage application can be a payment application, a digital wallet application, a social media application, etc. In some embodiments, interactions conducted using the storage application can require the use of a user identifier (e.g., a username and/or a secret such as a password or biometric).

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

DETAILED DESCRIPTION

Embodiments of the invention allow for interoperability of different interaction processing methods and systems. Using tokens, embodiments can allow a user to interact with a new interaction system without requiring the user to complete an onboarding process for the new interaction system. A user can initiate an interaction using a service with which the user has enrolled, even if the new interaction system does not process transactions using that service.

Embodiments are useful in instances where a user wishes to interact in a new interaction environment for a limited period of time or for a limited number of interactions. As an example, a user may be enrolled with an issuer that has issued a payment card such as a credit card in the user's home country. However, if the user travels abroad to a foreign country, the foreign country may not process payment card transactions as commonly as in the user's home country. In this situation, the user's ability to conduct transactions in the foreign country is very limited. This is particularly problematic if the user will be in the foreign country for a limited time (e.g., a week). Because the user is in the foreign country for only a limited time, the user may not want to go through the necessary onboarding process (e.g., setting up an account, downloading an app, etc.) to be able to use a transaction method that is ubiquitous in the foreign country.

In one example, a user may wish to conduct an interaction with a resource provider in order to gain access to a resource (e.g., a good or service, access to a secure location, etc.). The user may operate a user device comprising a storage application (e.g., a digital wallet) that maintains an account on behalf of the user, and can enable the user to initiate interactions. The resource provider may not accept interactions initiated by the storage application. For example, the resource provider may operate an access device (e.g., a POS or point of sale terminal) which processes interactions using credentials (e.g., payment card numbers) and tokens (e.g., substitutes for payment card numbers), whereas the storage application may process interactions using a user identifier (e.g., a username used to access the storage application) and a virtual account. In this example, embodiments of the invention can exchange the user identifier for a limited use token to enable the user to conduct the interaction at the access device. The user can cause a user device to receive the limited use token in exchange for the user identifier for a storage application and transmit the token to a resource provider computer such as an access device. The resource provider computer can send the token to a processing network computer in an authorization request message. After receiving the authorization request message, the processing network can transform the authorization request message, and route it to the storage application server computer associated with the storage application, for authorization.

In some embodiments, the processing network computer may have proxy accounts to enable settlement with different types of authorizing entities. Whenever the user conducts an interaction in a new environment, a proxy account may be debited on behalf of the user so that the resource provider's account can be credited. Meanwhile, in the user's primary interaction processing environment, the user's account is debited and a proxy account is credited. These accounts can serve as intermediary accounts on behalf of the user.

Although payment transaction are discussed in detail, embodiments are not limited thereto. Other embodiments can include interactions that include access to secure data (e.g., secure and sensitive information), secure locations (e.g., transit terminals), etc.

FIG. 1 shows an interaction processing system 100 according to embodiments of the disclosure. The system 100 comprises a user device 102, an access device 104, a storage application server computer 101, a token service computer 110, a processing network computer 108, and a transport computer 114. The processing network computer 108 can be in operable communication with the storage application server computer 101, the token service computer 110, and the transport computer 114. The storage application server computer 101 may be associated with a storage application 102A on the user device 102, and can send and receive information to and from the user device 102 and the token service computer 110. The access device 104 can communicate with the user device 102 and the transport computer 114.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

Messages between at least the devices of the system in FIG. 1 can be transmitted using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

An interaction may involve a user operating the user device 102 requesting access to a resource from a resource provider (e.g., a merchant, an entity that allows access to a secure location, etc.). The resource provider may operate the access device 104, and may be associated with the transport computer 114. For example, the transport computer 114 may be operated by an acquirer, which can manage an account on behalf of the resource provider. The access device 104 may require a token or a credential that has sixteen digits to conduct the interaction, but the user may wish to use an account associated with the storage application 102A for the interaction. For example, the storage application can be a digital wallet application such as a WeChat™ application. The access device 104 may be an example of a resource provider computer in some embodiments. The storage application 102A may use user identifiers (e.g., an e-mail address and a password), instead of tokens, to access an account associated with the storage application 102A. The storage application 102A may be managed by the storage application server computer 101.

Storage application server computer 101 may issue a storage application account for the user operating user device 102. The storage application server computer 101 can provide the storage application 102A to the user device 102. In some embodiments, the storage application server computer 101 can send and receive messages to and from the storage application 102A. The storage application server computer 101 may maintain one or more storage application accounts for a plurality of users, and each account may be associated with a user identifier.

In some embodiments, the storage application server computer 101 can maintain a proxy account. The storage application server computer 101 can use the proxy account to enable settlement for an interaction that may be outside of the user's home environment. In one example, the user's funds may be transferred from the user's storage application account to the proxy account, and vice versa. In some embodiments, the proxy account may be associated with and maintained by the processing network computer 108.

The processing network computer 108 can communicate with the token service computer 110 to obtain temporary user identifiers, tokenize credentials, detokenize tokens, and obtain credentials or tokens associated with user identifiers. In some embodiments, the processing network computer 108 may receive authorization request messages from a transport computer 114, and transform the authorization request messages before routing them to the storage application server computer 101. The processing network computer 108 may also settle interactions with the transport computer 114.

The token service computer 110 can include one or more computers that generate, process, and maintain tokens (e.g., limited use token) and temporary user identifiers. For example, the token service computer 110 may include or be in communication with a token database where the generated tokens are stored. The token database may maintain a one-to-one mapping between a token and a credential represented by the token. Additionally, or alternatively, the token database can maintain mappings of temporary user identifiers to credentials and/or tokens. In some embodiments, various entities of a tokenization ecosystem may assume the roles of the token service computer 110. For example, the processing network computer 108 can include the token service computer 110 by implementing the token services. The token service computer 110 can also store tokens and temporary user identifiers in association with their corresponding credentials.

Figure 2:
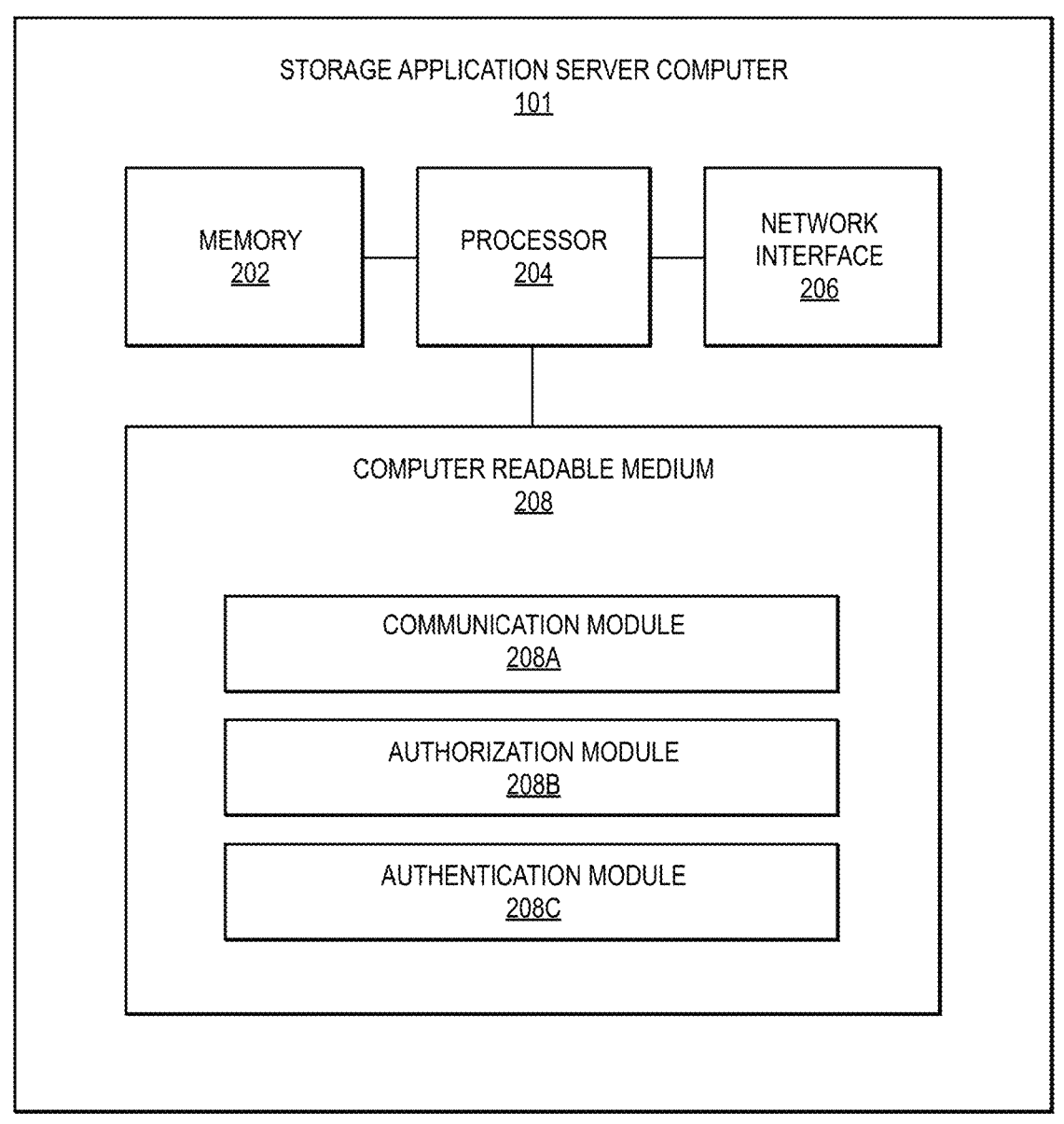
FIG. 2 shows a block diagram of an exemplary storage application server computer.

FIG. 2 shows a block diagram of an example storage application server computer 101. The storage application server computer 101 may comprise a processor 204 coupled to a memory 202, a network interface 206, and a computer readable medium 208. The computer readable medium can comprise a communication module 208A an authorization module 208B, and an authentication module 208C.

The memory 202 can be used to store data and code. The memory 202 may be coupled to the processor 204 internally or externally (e.g., cloud based data storage), and may comprise any combination of volatile and/or non-volatile memory, such as RAM, DRAM, ROM, flash, or any other suitable memory device. For example, the memory 202 can store interaction data, tokens, etc.

The communication module 208A may comprise code or software, executable by the processor 204, for communicating with other devices. The communication module 208A may be configured or programmed to perform some or all of the functionality associated with receiving, sending, and generating electronic messages for transmission. The communication module 208A, in conjunction with the processor 204, may receive information from the computer readable medium 208 and generate an electronic message in an appropriate data format in conformance with a transmission protocol so that the message may be sent to one or more entities. The electronic message may then be passed to the network interface 206 for transmission.

The authorization module 208B may comprise code or software, executable by the processor 204, for processing authorization request messages, determining whether or not to authorize an interaction, and generating authorization response messages. The authorization module 208B can comprise code that evaluates data in authorization request messages, such as user identifiers, the values of the interactions, etc. to determine whether or not to authorize an interaction. The authentication module 208C may, in conjunction with the processor 204, perform any suitable type of authentication functions. For example, the authentication module 208C, in conjunction with the processor, can verify the identity of a user initiating an interaction.

The network interface 206 may include an interface that can allow the storage application server computer 101 to communicate with external computers. The network interface 206 may enable the storage application server computer 101 to communicate data to and from another device (e.g., user devices, processing network computers, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Figure 3:
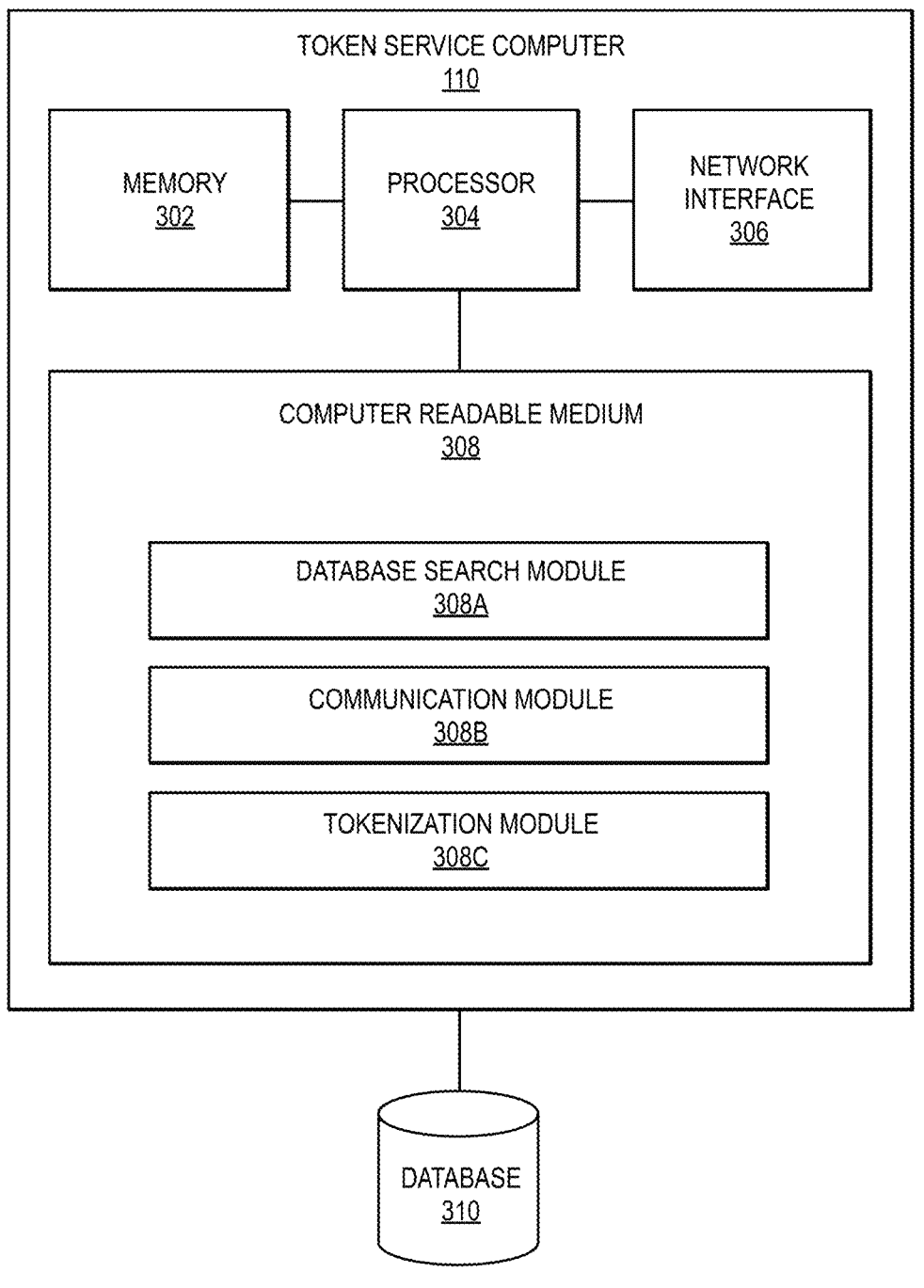
FIG. 3 shows a block diagram of an exemplary token service computer.

FIG. 3 shows a block diagram of an example token service computer 110. The exemplary token service computer 110 may comprise a processor 304. The processor 304 may be coupled to a memory 302, a network interface 306 and a computer readable medium 308. The computer readable medium 308 can comprise a database search module 308A, a communication module 308B, a tokenization module 308C, and a verification module 308D. The token service computer 110 can be in operative communication with a database 310.

The memory 302 can be used to store data and code. The memory 302 may be coupled to the processor 304 internally or externally (e.g., cloud based data storage), and may comprise any combination of volatile and/or non-volatile memory, such as RAM, DRAM, ROM, flash, or any other suitable memory device. For example, the memory 302 can store credentials, tokens, user identifiers, service provider identifiers, etc.

The computer readable medium 308 may comprise code, executable by the processor 304, for performing a method comprising: receiving, from a storage application server computer, a token request message comprising a user identifier associated with a storage application on a user device; determining, a token, wherein the token is a limited use token; mapping the token to the user identifier; transmitting, a token response message comprising the token to the storage application server computer, which provides the token to the storage application on the user device; receiving, from a processing network computer, a de-tokenization request message comprising the token, after the processing network computer receives an authorization request message comprising the token from the user device via a resource provider computer; determining, the user identifier using the token; transmitting, the user identifier to the processing network computer, wherein the processing network computer transforms the authorization request message and sends the transformed authorization request message to the storage application server computer for authorization.

The computer readable medium 308 may also or alternatively comprise code, executable by the processor 304, for performing a method comprising: receiving, by the token service computer from a service provider computer, a temporary user identifier request message comprising a token or a credential associated with a service provider application on a user device; determining, by the token service computer, a temporary user identifier; mapping, by the token service computer, the token to the temporary user identifier; transmitting, by the token service computer, a temporary user identifier response message comprising the temporary user identifier to (i) the service provider computer, which provides the temporary user identifier to the service provider application on the user device or (ii) a storage application server computer; receiving, by the token service computer from a processing network computer, a temporary user identifier resolve request message comprising the temporary user identifier, after the processing network computer receives an authorization request message comprising the temporary user identifier from the user device via the storage application server computer; determining, by the token service computer, the token or credential using the temporary user identifier; and transmitting, by the token service computer, the token or the credential to the processing network computer, wherein the processing network computer transforms the authorization request message and sends the transformed authorization request message to an authorizing entity computer for authorization.

The database search module 308A may comprise code or software, executable by the processor 304, for searching a database and obtaining data from the database. The database search module 308A, in conjunction with the processor 304, can search a database, such as the database 310, for tokens, credentials, and user identifiers.

The communication module 308B can be similar to the communication module 208A and will not be repeated here. The network interface 306 can be similar to the network interface 206 and will not be repeated here.

The tokenization module 308C may comprise code or software, executable by the processor 304, for tokenizing data (e.g., selecting from a database of available tokens or generating a token) and storing the data and the token in a database. The tokenization module 308C can also comprise software, executable by the processor, to generate and verify token cryptograms.

The database 310 can include any suitable database. The database 310 may be a conventional, fault tolerant, relational, scalable, secure database such as those commercially available from Oracle™ or Sybase™. The database 310 can store credentials, tokens, and user identifiers. The database 310 can be a token vault.

Figure 4:
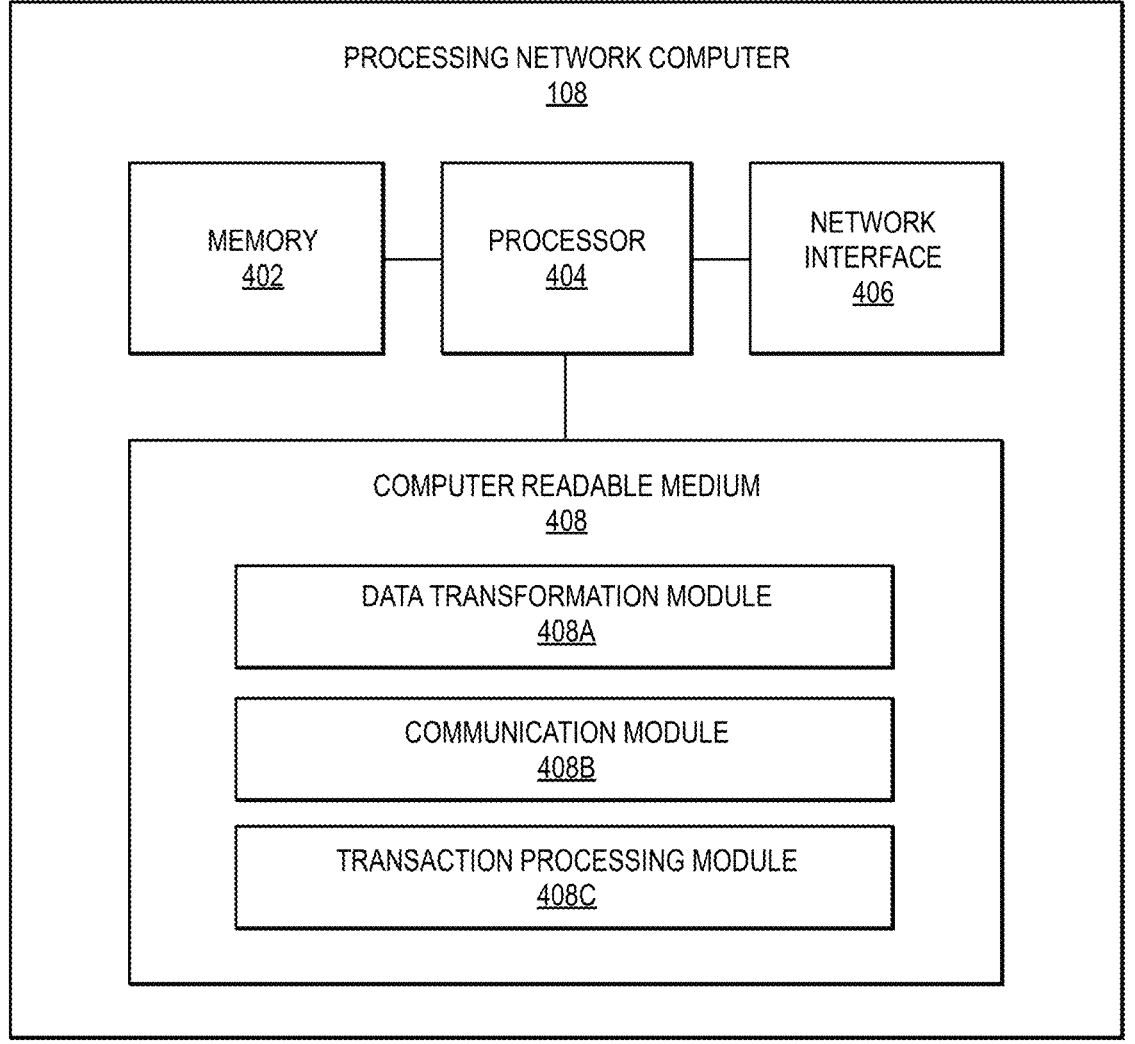
FIG. 4 shows a block diagram of an exemplary processing network computer.

FIG. 4 shows a block diagram of an example processing network computer 108. The processing network computer 108 can include functionality for facilitating the processing of interactions. The processing network computer 108 may include data processing subsystems, networks, and operations used to support and deliver authorization services, exception file services, and clearing and settlement services. The processing network computer 108 be in a transaction processing network. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The processing network computer 108 may use any suitable wired or wireless network, including the Internet.

The processing network computer 108 can comprise a processor 404 coupled to a memory 402, a network interface 406, and a computer readable medium 408. The computer readable medium can comprise a data transformation module 408A, a communication module 408B, and a transaction processing module.

The memory 402 can be used to store data and code. The memory 402 may be coupled to the processor 404 internally or externally (e.g., cloud based data storage), and may comprise any combination of volatile and/or non-volatile memory, such as RAM, DRAM, ROM, flash, or any other suitable memory device. For example, the memory 402 can store interaction data, tokens, credentials, etc.

The data transformation module 408A may comprise code or software, executable by the processor 404, for transforming data from a first format to a second format. In some embodiments, the first format may be a JSON format and the second format may be an ISO 8583 format. In other embodiments, the first format can be an ISO 8583 format and the second format can be a JSON format.

The communication module 408B may comprise code or software, executable by the processor 404, for communicating with other devices. The communication module 408B may be configured or programmed to perform some or all of the functionality associated with receiving, sending, and generating electronic messages for transmission through the processing network computer 108 to or from any of the devices shown in FIG. 1.

The transaction processing module 408C can comprise code, executable by the processor 404 to perform authorization request message and authorization response message routing and processing. It may also include code executable by the processor 404 to perform transaction clearing and settlement processing.

The network interface 406 can be similar to the network interface 206 of FIG. 2 and its description will not be repeated here.

Figure 5:
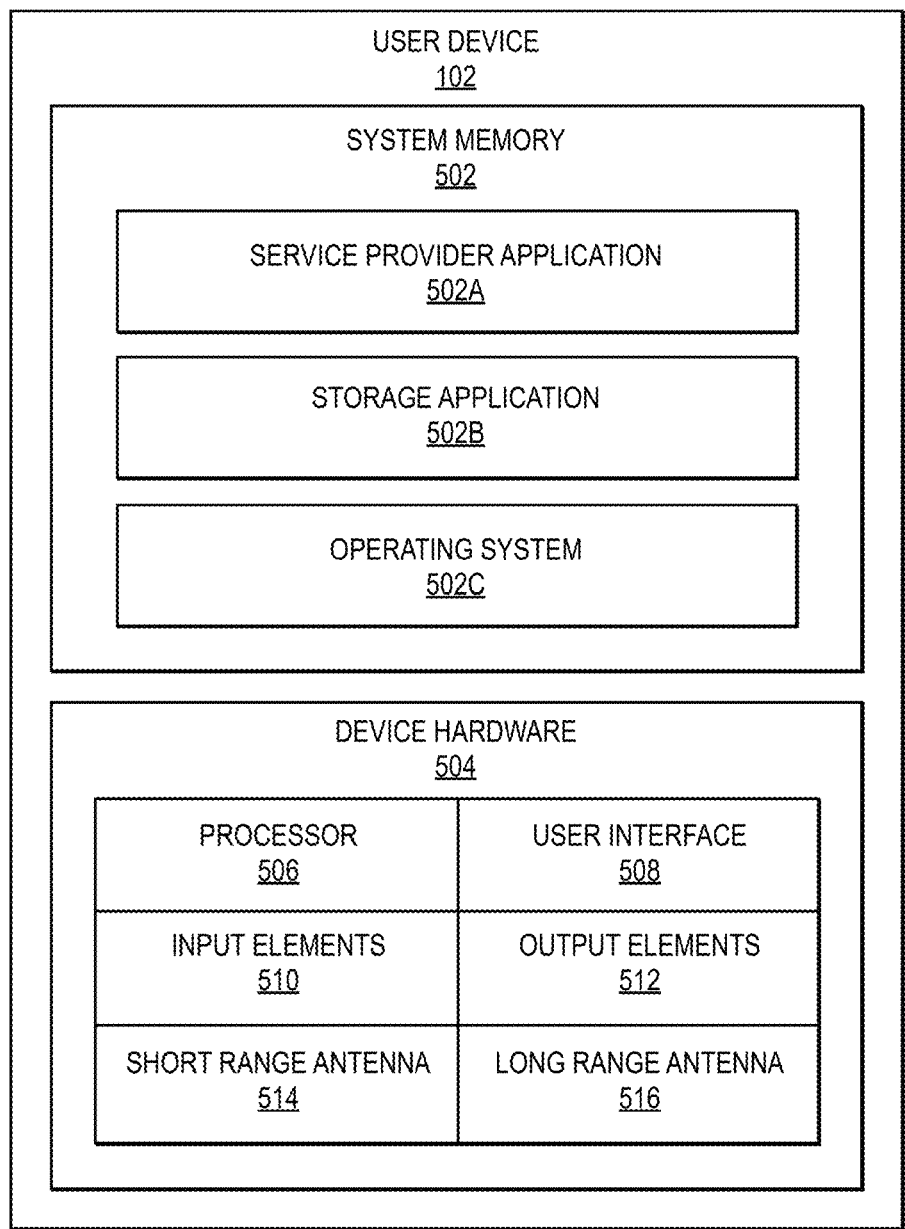
FIG. 5 shows a block diagram of an exemplary user device.

FIG. 5 shows a block diagram of an example user device 500. User device 500 may include device hardware 504 coupled to a system memory 502.

Device hardware 504 may include a processor 506, a short range antenna 514, a long range antenna 516, input elements 510, a user interface 508, and output elements 512 (which may be part of the user interface 508). Examples of input elements may include microphones, keypads, touchscreens, sensors, etc. Examples of output elements may include speakers, display screens, and tactile devices. The processor 506 can be implemented as one or more integrated circuits (e.g., one or more single core or multicore microprocessors and/or microcontrollers), and is used to control the operation of user device 500. The processor 506 can execute a variety of programs in response to program code or computer-readable code stored in the system memory 502, and can maintain multiple concurrently executing programs or processes.

The long range antenna 516 may include one or more RF transceivers and/or connectors that can be used by user device 102 to communicate with other devices and/or to connect with external networks. The long range antenna 516 may be configured to communicate with a remote base station and a remote cellular or data network, over the air. The short range antenna 509 may be configured to communicate with external entities through a short range communication medium. The short range antenna 509 may comprise a contactless interface that can interact with a contactless interface of another device (e.g., a portable device). Examples of a contactless interface may include one or more radio frequency (RF) transceivers that can send and receive communications using near-field communications (NFC), or other radio frequency or wireless communication protocols. The user interface 508 can include any combination of input and output elements to allow a user to interact with and invoke the functionalities of user device 500.

The system memory 502 can be implemented using any combination of any number of non-volatile memories (e.g., flash memory) and volatile memories (e.g., DRAM, SRAM), or any other non-transitory storage medium, or a combination thereof media. The system memory 502 may store a service provider application 502A, a storage application 502B, and an operating system 502C. In some embodiments, the user device 102 has one of the service provider application 502A and the storage application 502B, but not both.

Service provider application 502A may be any application that can run on user device 102 that provides certain services to the user of user device 102. The service provider application 502A may include instructions or code executable by the processor 506 for initiating and conducting an interaction with an external device such as an access device, and for transmitting interaction request messages to a service provider computer. In an exemplary case, service provider application 502A may be a wallet application.

The storage application 502B be managed by a storage application server computer and be a part of an interaction processing network that uses user identifiers such as usernames to perform interactions. The storage application 502B can include instructions or code executable by the processor 506 for initiating and conducting an interaction with an external device such as an access device, and for transmitting interaction request messages to a storage application server computer. The storage application 502B may also be a wallet application, but may operate differently than the service provider application 502A.

Referring back to FIG. 1, a method according to embodiments can be described with respect to system 100.

At step S2, the user can operate the user device 102 to initiate an interaction with a resource provider operating an access device 104 that is not configured to process storage application 102A based interactions. For example, the resource provider may not have a storage application account, and the user may wish to use funds available in their storage application account. The user's storage application account may be associated with a user identifier (e.g., John@Venmo), but the access device 104 cannot process the interaction with the user identifier.

For example, the user may be travelling in an area where acceptance of storage application 102A based interactions is rare, and credential and token based interactions are common. While travelling, the user may wish to gain access to a resource or good offered by a resource provider, but the user may not have an account registered with the credential and token based interaction system. During a typical conventional interaction, in order to conduct the interaction and gain access to the resource in the credential and token basd system, the user may be required to obtain a new credential or token from an authorizing entity. The user will then need to register with that authorizing entity to obtain an account associated with the new credential or token. Alternatively, the user may have a first account registered with the credential and token based interaction system, but may have funds in a second account that is not compatible with the credential and the token based interaction system. The user would have to transfer funds from the second account to the first account prior to initiating the interaction. In both examples, the user must perform several steps, which is inconvenient and consumes computing resources.

Rather than registering a new account under the credential and token based interaction system, the user can operate the storage application 102A on the user device 102 to request a limited use token or credential from a token server computer. The user can input interaction details into the storage application 102A with which they are already enrolled. Interaction details may include a value for the interaction, a location, a date, etc. In some embodiments, the user can specify a period of time or a maximum volume of interactions that they would like to conduct using the limited use token. For example, if the user is travelling for three days in an area where acceptance of storage application 102A based interactions is uncommon, the may set the period of time to three days. The user device 102 may transmit the interaction details and a user identifier associated with the storage application 102A to the storage application server computer 101.

At step S4, after receiving the request for a limited use token or credential comprising the user identifier and the interaction details from the user device 102, the storage application server computer 101 can request the limited use token from the token service computer 110. The storage application server computer 101 can transmit a token request message comprising the user identifier to the token service computer 110. In some embodiments, the storage application server computer 101 may place a hold on the account associated with the user identifier. The amount of the hold can relate to the value for the interaction, or optionally, the maximum volume of interactions set by the user in step S202. For example, the hold on the account may be placed to prevent more than an amount of 500 of currency X to be withdrawn from the account via the limited use token.

At step S5, after receiving the token request message comprising the user identifier, the token service computer

110 can determine a limited use token, map it to the user identifier, and store the mapping. The limited use token may have the same format as a credential, and the access device 104 can process tokens or credentials in that format. Optionally, the token service computer 110 may check the account associated with the user identifier, for example, to understand how much the account can fund or if there is a hold on the account. Optionally, if a hold or expiration is placed on the limited use token, the token service computer 110 may also store this information.

At step S6, the token service computer 110 can transmit a token response message comprising the limited use token to the storage application server computer 101. The token service computer 110 may further transmit token cryptograms, cryptographic keys, check values, and/or details regarding when the limited use token expires. For example, in some embodiments, the user may not have specified the period of time or maximum volume of interactions, so the token service computer 110 may determine when the limited use token expires. The token service computer 110 may indicate in the token response message to the storage application server computer 101 that the limited use token is valid for 50 interactions. Additionally, or alternatively, the token service computer 110 can specify that the limited use token expires after a specific duration (e.g., 24 hours).

In some embodiments, upon the expiration of the limited use token, the mapping stored by the token service computer 110 may no longer be maintained. The limited use token may then be re-used with a different user identifier.

At step S8, after receiving the limited use token from the token service computer 110, the storage application server computer 101 may transmit the limited use token to the storage application 102A on the user device 102.

At step S10, the user, using the user device 102, can initiate an interaction by providing (e.g., transmitting) the limited use token to the access device 104. For example, after receiving the limited use token, the user may tap the user device 102 to the access device 104, and the access device 104 may obtain the limited use token from the storage application 102A via Near Field Communication (NFC). The limited use token may be in a format that the access device 104 can process.

At step S12, after receiving the limited use token from storage application 102A, the access device 104 can transmit an authorization request message comprising the limited use token to the transport computer 114.

At step S14, the transport computer 114 can transmit the authorization request comprising the limited use token to the processing network computer 108.

At step S16, after receiving the authorization request message comprising the limited use token from the transport computer 114, the processing network computer 108 can transmit a de-tokenization request message comprising the the limited use token to the token service computer 110. The token service computer 110 can receive the de-tokenization request message and determine the user identifier that is associated with the limited use token. The token service computer 110 can then transmit the user identifier to the processing network computer 108.

At step S18, after receiving the user identifier from the token service computer 110, the processing network computer 108 can transform the authorization request message and transmit the transformed authorization request message to the storage application server computer for authorization. The transformed authorization request message may comprise the user identifier and the value of the interaction. The transformed authorization request message may be a different format than format of the initial authorization request message. For example, the transformed authorization request message may be a second format such as a JSON data format and the authorization request message may be a first format such as an ISO 8583 message format. The processing network computer 108 can receive the authorization request message in an ISO 8583 message format and transform it to a JSON data format so that the storage application server computer 101 can process it. In some embodiments, transformation can occur by taking a message in a first format with data fields containing data, and forming another message in second format with different data fields. Data in the data fields in the message in the first format are automatically populated to the data fields in the message in the second format using a mapping protocol.

At step S20, after receiving the transformed authorization request message from the processing network computer 108, the storage application server computer 101 can transmit an authorization response message comprising the user identifier to the processing network computer 108. The authorization response message can be in a second format such as a JSON format.

At step S21, after receiving the authorization response message from the storage application server computer 101, the processing network computer 108 can transmit a re-tokenization request message comprising the user identifier to the token service computer 110. The token service computer 110 can determine the limited use token associated with the user identifier, and transmit the limited use token to the processing network computer 108.

At step S22, after receiving the limited use token from the token service computer 110, the processing network computer 108 can transform the authorization response message received from the storage application server computer 101 to include the limited use token. For example, the processing network computer 108 can transform the authorization response message from a JSON format to an ISO 8583 format. The processing network computer 108 can transmit the transformed authorization response message to the transport computer 114.

To transform the authorization response message, the processing network computer can replace the user identifier with the limited use token in the authorization response message. Furthermore, the processing network computer 108 may transform the format of the authorization response message prior to transmitting it to the transport computer 114. For example, the transport computer 114 may use an ISO 8583 message format to receive authorization response messages, and the storage application server computer 101 may transmit authorization response messages in a JSON data format. The processing network computer 108 can receive an authorization response message in a JSON data format comprising the user identifier, transform it to determine a transformed authorization response message in an ISO 8583 message format comprising the limited use token, and transmit the transformed authorization response message to the transport computer 114.

In some embodiments, if the storage application server computer 101 does not respond within a set period of time, the processing network computer 108 can generate an authorization response message on behalf of the storage application server computer 101. For example, after the processing network computer 108 sends the transformed authorization request message to the storage application server computer 101 for authorization at step S18, the processing network computer 108 may not receive an authorization response message from the storage application server computer 101 within five seconds, the processing network computer 108 may generate an authorization response message on behalf of the storage application server computer 101. The processing network computer 108 can then transmit the transformed authorization response message comprising the limited use token to the resource provider via a transport computer 114.

At step S24, the transport computer 114 can transmit the transformed authorization response message to the resource provider operating the access device 104. In some embodiments, the user initiates the interaction in order to gain access to a resource associated with the resource provider. The resource provider may determine whether or not to grant the user access to the resource based upon the authorization result. If the authorization result indicates that the authorization is approved, then access to the resource may be granted. If the authorization is not approved, then access to the resource may be denied.

At step S26, the storage application server computer 101 can settle the interaction. The storage application server computer 101 can debit the account associated with the user identifier, and credit a proxy account associated with the processing network computer 108.

At step S28, the processing network computer 108 and the transport computer 114 may settle the interaction and credit the value of the interaction to an account associated with the resource provider.

In steps S26 and S28, the transfer of funds can occur through conventional funds transfer processes such as ACH, wire transfers, etc.

Figure 6:
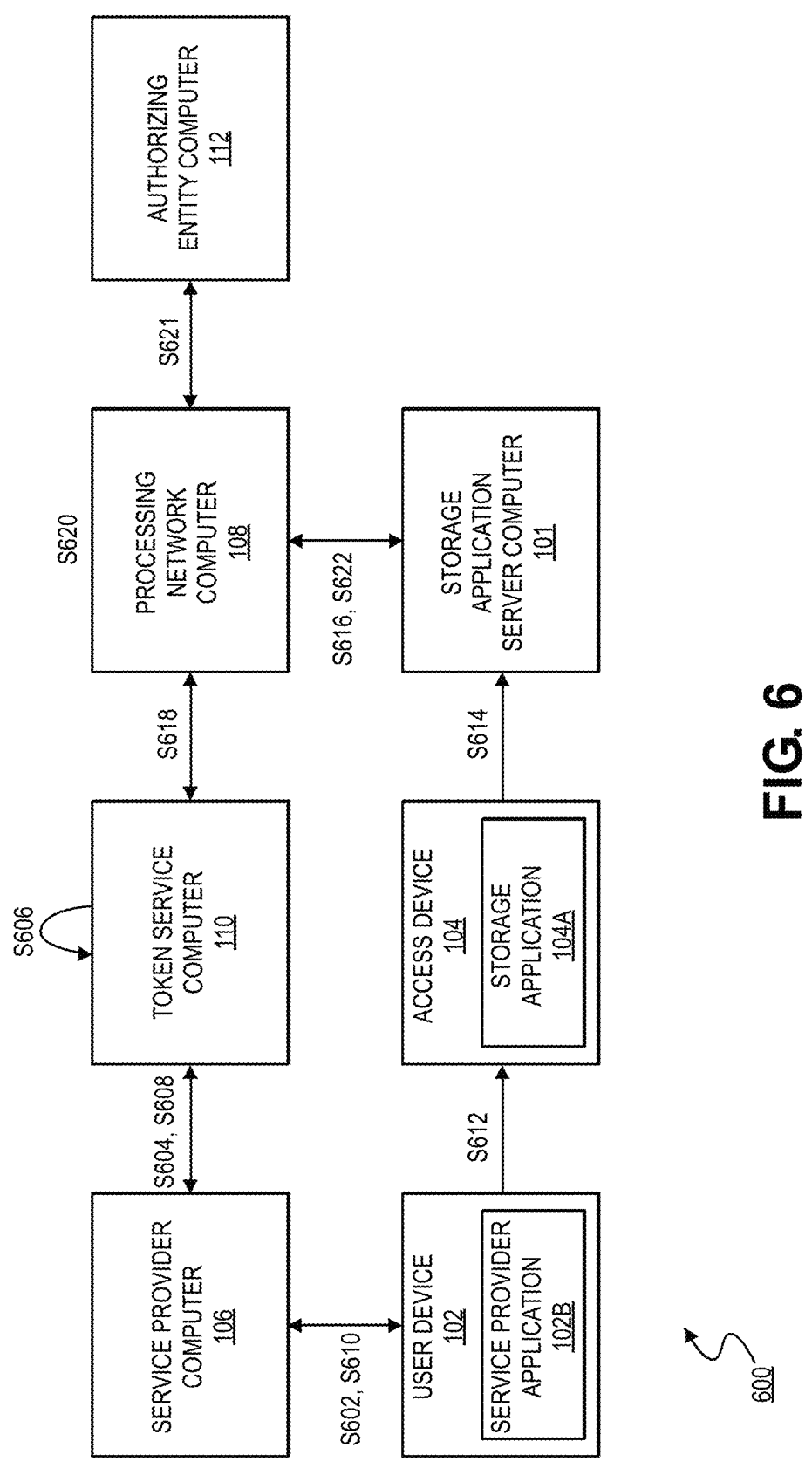
FIG. 6 shows a block diagram of a method and system for processing an interaction using a temporary user identifier according to some embodiments.

FIG. 6 shows a flow diagram of a method 600 for processing an interaction between a user operating a service provider application 102B and a resource provider that only accepts interactions using user identifiers associated with a specific storage application. The user device 102 comprising the service provider application 102B can obtain a temporary user identifier for the user, and the user can present the temporary user identifier to the service provider so the service provider can initiate the interaction via the storage application 104A.

The system can comprise a user device 102, an access device 104, a storage application server computer 101, a processing network computer 108, an authorizing entity computer 112, a token service computer 110, and a service provider computer 106. The user device 102 can comprise a service provider application 102B, and be in operable communication with the service provider computer 106, and access device 104. The service provider computer 106, and the processing network computer 108, may communicate with the token service computer 110. The access device 104 may be operated by a resource provider, and may comprise a storage application 104A. The storage application 104A can be associated with the storage application server computer 101. The processing network computer 108 can be in operable communication with the token service computer 110, the authorizing entity computer 112, and the storage application server computer 101.

The service provider computer 106 may allow the service provider application 102B and the processing network computer 108 to communicate with each other. The service provider application 102B can include an application configured to provide a service. For example, the service provider application 102B may can enable the user to conduct interactions via an account managed by the authorizing entity computer 112. In some embodiments, the service provider application 102B can be a digital wallet, which can store one or more credentials and/or tokens. The user of the user device 102 can utilize the one or more credentials and/or tokens to conduct interactions. The service provider application 102B can be a digital wallet such as ApplePay™, Google Wallet™, etc.

The authorizing entity computer 112 can be operated by an authorizing entity such as an issuer bank. It can authorize an interaction conduced by a user using a credential. The authorizing entity computer 112 can issue and manage one or more accounts (e.g., payment card accounts) associated with the user of the user device 102.

At step S602, the user can operate the service provider application 102B on the user device 102 to request a temporary user identifier. The service provider application 102B on the user device 102 can provide a token or credential to the service provider computer 106. The token or credential may be associated with the account that the user would like to use for the interaction. The user may further input interaction details such as a value for the interaction, a location, a date, and a time into the service provider application 102B.

A resource provider may use storage application 104A on the access device 104. To initiate a typical interaction, the resource provider can input a user identifier associated with the account that is funding the interaction into the access device. However, the user operating user device 102 may not have a storage application account. Instead of downloading the storage application and registering with it, the user can request a temporary user identifier and can provide the temporary user identifier to the resource provider. The resource provider can input the temporary user identifier into the storage application 104A and initiate the interaction.

The temporary user identifier may be the same format as the user identifiers used by the storage application 104A. For example, a user identifier may be a username, such as John@venmo, and the temporary user identifier may be 123456890byVisa@venmo. The temporary user identifier may be linked to a proxy account with available funds.

In some embodiments, the service provider application 102B may recognize that the user is in a new environment. For example, the service provider application 102B can acknowledge that based on the location of the user device 102, the user may be in a new environment. The service provider application 102B can ask the user if they would like a temporary user identifier to perform interactions in the new environment. The user can agree and select an account to use for the interaction. The service provider application 102B can send the credential or token associated with the selected account to the service provider computer 106.

At step S604, after receiving the credential or token from the service provider application 102B, the service provider computer 106 may generate and transmit a temporary user identifier request message comprising the credential or token to the token service computer 110.

At step S606, after receiving the temporary user identifier request message comprising the credential or token from the service provider application 102B, the token service computer 110 can determine a temporary user identifier. The token service computer 110 can map the temporary user identifier to the credential or token, and store the mapping. The temporary user identifier may be associated with a time-to-live. For example, the temporary user identifier may be valid for 24 hours. The time-to-live may be stored in association with the temporary user identifier.

At step S608, the token service computer 110 can transmit a temporary user identifier response message comprising the temporary user identifier to the service provider computer 106.

At step S610, the service provider computer 106 can provide the temporary user identifier to the service provider application 102B on the user device 102.

At step S612, the user may present the temporary user identifier to the service provider and the user device 102 can transmit the temporary user identifier to the storage application 104A on the access device 104. For example, after receiving the temporary user identifier, the service provider application 102B may create a QR code of the temporary user identifier and display it on the user device 102. The user can present the QR code to the service provider, and the service provider can scan the QR code using the storage application 104A to obtain the temporary user identifier.

At step S614, the storage application 104A may transmit the temporary user identifier and other interaction details (e.g., a value for the interaction, a cryptogram) to the storage application server computer 101. For example, after obtaining the temporary user identifier from the user, the resource provider can initiate the interaction and submit interaction details using the storage application 104A.

At step S616, the storage application server computer 101 can transmit an authorization request message comprising the temporary user identifier and the interaction details to the processing network computer 108.

At step S618, after receiving the authorization request message comprising the temporary user identifier, the processing network computer 108 can transmit a temporary user identifier resolve request message comprising the temporary user identifier to the token service computer 110. The token service computer 110 can determine the token or credential based upon the temporary user identifier. For example, the token service computer 110 can search a database for mappings associated with the temporary user identifier to retrieve the token or credential. If the temporary user identifier is mapped to the token, the token service computer 110 may further detokenize the token to obtain the credential associated with the token. The token service computer 110 can transmit the credential to the processing network computer 108.

At step S620, after receiving the credential from the token service computer 110, the processing network computer 108 can transform the authorization request message in the first format to a second format (e.g., from a JSON format to an ISO 8583 format). The processing network computer 108 can replace the temporary user identifier with the credential, thereby generating a transformed authorization request message comprising the credential.

At step S621, the processing network computer 108 can route the transformed authorization request message to the authorizing entity computer 112 for authorization. The authorizing entity computer 112 can determine whether or not the interaction is authorized by analyzing the user's account and the interaction amount. It can then transmit an authorization response message comprising the credential and the authorization determination to the processing network computer 108.

At step S622, after receiving the authorization response message from the authorizing entity computer 112, the processing network computer 108 can transform the authorization response message and transmit the transformed authorization response message to the storage application server computer 101. The processing network computer 108 may transform the authorization response message by reformatting the authorization response message to the messaging protocol used by the storage application server computer 101. For example, the storage application server computer 101 may use a first format and the authorizing entity computer 112 may use a second format. The authorization response message received from the authorizing entity computer 112 may be in the second format, and comprise the credential. The processing network computer 108 can transform the authorization response message to be in the first format, and can replace the credential with the temporary user identifier.

If the transformed authorization response message indicates that the interaction was authorized, the storage application server computer 101 may settle the interaction between the proxy account and the service provider, and the processing network computer 108 can separately settle the interaction with the authorizing entity computer 112. For example, the storage application server computer 101 can debit the proxy account for the value of the interaction, and credit the service provider's account, while the processing network computer 108 can debit the user's account associated with the credential and credit the proxy account.

Figure 7:
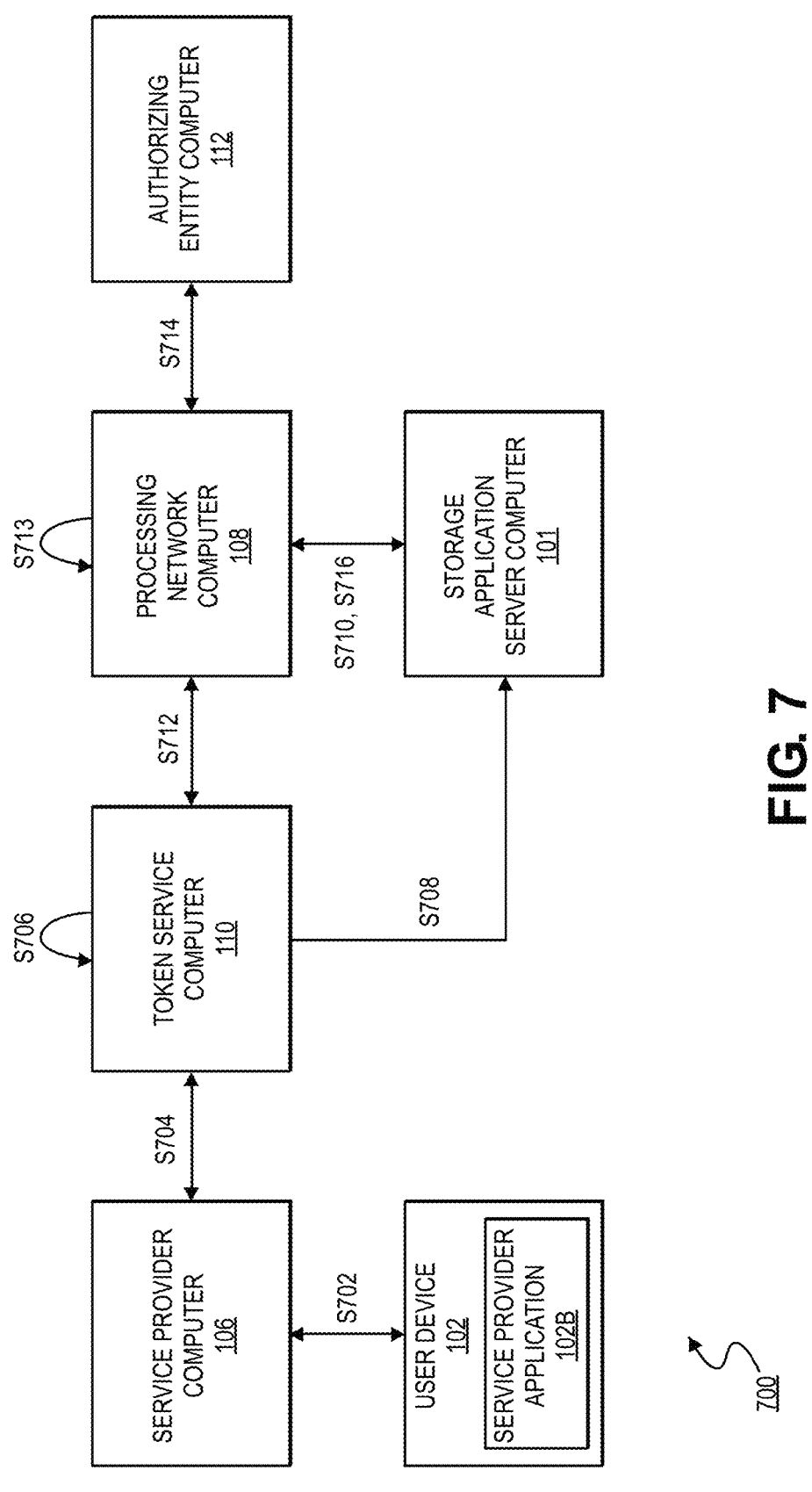
FIG. 7 shows a block diagram of another method and system for processing an interaction using a temporary user identifier according to some embodiments.

FIG. 7 shows a flow diagram of a method 700 for processing an interaction between a user operating a service provider application 102B and a resource provider. The resource provider may wish to conduct the interaction using an account managed by a storage application server computer 101. The resource provider can present to the user a user identifier associated with that account and the user can operate a service provider application 102B on user device 102 to initiate the interaction.

FIG. 7 shows a service provider computer 106, a token service computer 110, a processing network computer 108, an authorizing entity computer 112, a storage application server computer 101, and a user device 102. The service provider computer 106 can be in operable communication with the user device 102 and the token service computer 110. The processing network computer 108 can send and receive messages (e.g., authorization request and response messages, token request and response messages) between the token service computer 110, the authorizing entity computer 112, and the storage application server computer 101. The storage application server computer 101 may also be in operable communication with the token service computer 110.

Prior to S702, the resource provider can present to the user a resource provider user identifier (e.g., CupcakesByMolly@Venmo) associated with a resource provider account managed by the storage application server computer 101. The user may operate the service provider application 102B, indicate that they would like to initiate an interaction with a storage application account, and input the resource provider user identifier. For example, the user can scan a QR code presented by the resource provider to obtain the resource provider user identifier. In another example, the user can manually input the resource provider user identifier to the service provider application 102B. The user can select an account to use for the interaction and input interaction details such as interaction type (e.g., storage application based interaction, a value for the interaction) and a time-to-live to the service provider application 102B.

At step S702, after receiving input from the user, the service provider application 102B can transmit to the service provider computer 106 the interaction details and the resource provider user identifier. The service provider application 102B may further transmit a token or credential associated with the account selected by the user.

At step S704, after receiving the resource provider user identifier, the user token or credential, and interaction details from the service provider application 102B, the service provider computer 106 can transmit a temporary user identifier request message comprising the token or credential to the token service computer 110. The token request message may be requesting a temporary user identifier formatted for processing by the storage application server computer 101. The service provider computer 106 may further transmit the resource provider user identifier and the interaction details to the token server computer 110.

At step S706, after receiving the temporary user identifier request message comprising the token or credential, the token service computer 110 can determine a temporary user identifier. The temporary user identifier may be formatted for processing by the storage application server computer 101. The token service computer 110 can map the temporary user identifier to the token or credential and store the mapping in a database. The temporary user identifier may also be stored in association with a time-to-live.

At step S708, the token service computer 110 can transmit a temporary user identifier response message to the storage application server computer 101. The temporary user identifier response message can comprise the temporary user identifier, the resource provider user identifier, and the interaction details.

At step S710, after receiving the temporary user identifier response message from the token service computer 110, the storage application server computer 101 can transmit an authorization request message to the processing network computer 108 comprising the temporary user identifier, the resource provider user identifier, and the interaction details. The authorization request message can be in a first format such as a JSON format.

At step S712, after receiving the authorization request message from the storage application server computer 101, the processing network computer 108 can verify the temporary user identifier, and detokenize the temporary user identifier with the token service computer 110. The processing network computer 108 can transmit to the token service computer 110 a temporary user identifier resolve request comprising the temporary user identifier, and the token service computer 110 can determine the token or credential stored in association with the temporary user identifier. If the temporary user identifier is stored in associated with a token, the token service computer 110 can further detokenize the token to obtain the underlying credential. The token service computer 110 can transmit to the processing network computer 108 a de-tokenization response message comprising the credential and the interaction data (e.g., the amount of the transaction).

At step S713, after receiving the credential from the token service computer 110, the processing network computer 108 can transform the authorization request message and transmit the transformed authorization request message to the authorizing entity computer 112. The processing network computer 108 may transform the authorization request message to the messaging format of the authorizing entity computer 112. For example, the processing network computer 108 may receive the authorization request message in a JSON data format, and the authorization request message may comprise a temporary user identifier. The authorizing entity computer 112 may use a different messaging protocol, such as ISO 8583, and use credentials as account identifiers. The processing network computer 108 can generate a transformed authorization request message in the ISO 8583 format comprising the credential.

At step S714, the processing network computer 108 can transmit the transformed authorization request message to the authorizing entity computer 112. The authorizing entity computer 112 can determine whether or not the interaction is authorized by analyzing the user's account and the interaction data associated with the authorization request message. The authorizing entity computer 112 can transmit an authorization response message comprising the determination to the processing network computer 108. If the authorizing entity determines that the interaction is authorized, the authorizing entity can debit the user's account and credit a proxy account.

At step S716, after receiving the authorization response message from the authorizing entity computer 112, the processing network computer 108 can transform (e.g., from an ISO 8583 format to a JSON format) the authorization response message and transmit it to the storage application server computer 101. For example, the transformed authorization response message may comprise the temporary user identifier. After receiving the transformed authorization response message the storage application server computer 101 can process the interaction by debiting the proxy account and crediting the resource provider account.

Embodiments of the disclosure have a number of technical advantages. As shown above, the methods according to embodiments of the invention enable users to conduct interactions in foreign environments. Users can avoid onboarding processes which may be excessive if they only intend to conduct a limited number of interactions. Resource providers do not need to make extra accommodations for users, and can use familiar methods to initiate interactions. Yet another advantage relates to data security. In some embodiments, because a limited use credential is used by a user instead of a real user identifier, the real user identifier is protected from hacking or man-in-the middle attacks. In other embodiments, because a temporary user identifier is used by a user instead of a token or credential, they are protected from hacking or man-in-the middle attacks.

Other embodiments of the invention can include the following.

Another embodiment of the invention includes a method comprising: receiving, by a processing network computer, an authorization request message comprising a token from a resource provider computer; providing, by the processing network computer to a token service computer a de-tokenization request message comprising the token, wherein the token service computer determines a user identifier using the token; receiving, by the processing network computer, the user identifier; transforming, by the processing network, the authorization request message to comprise the user identifier instead of the token; and transmitting, by the processing network computer, the transformed authorization request message comprising the user identifier to a storage application server computer for authorization.

Another embodiment of the invention includes a method comprising: receiving, by a processing network computer, an authorization request message comprising a user identifier from a resource provider computer; providing, by the processing network computer to a token service computer a de-tokenization request message comprising the user identifier, wherein the token service computer determines a credential using the user identifier; receiving, by the processing network computer, the credential; transforming, by the processing network, the authorization request message to comprise the credential instead of the token; and transmitting, by the processing network computer, the transformed authorization request message comprising the credential to an authorizing entity computer for authorization.

Although the steps in the flowcharts and process flows described above are illustrated or described in a specific order, it is understood that embodiments of the invention may include methods that have the steps in different orders. In addition, steps may be omitted or added and may still be within embodiments of the invention.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
receiving, by a token service computer from a storage application server computer, a token request message comprising a user identifier associated with a storage application on a user device operated by user;
determining, by the token service computer, a token, wherein the token is a limited use token;
mapping, by the token service computer, the token to the user identifier;
transmitting, by the token service computer, a token response message comprising the token to the storage application server computer, which provides the token to the storage application on the user device;
receiving, by the token service computer from a processing network computer, a de-tokenization request message comprising the token, after the processing network computer receives an authorization request message comprising the token from a resource provider computer;

determining, by the token service computer, the user identifier using the token; and
transmitting, by the token service computer, the user identifier to the processing network computer, wherein the processing network computer transforms the authorization request message and sends the transformed authorization request message to the storage application server computer for authorization.

2. The method of claim 1, further comprising:
receiving, by the token service computer from the processing network computer, a re-tokenization request message, after the processing network computer receives an authorization response message comprising the user identifier from the storage application server computer;
determining, by the token service computer, the token using the user identifier; and
transmitting, by the token service computer, the token to the processing network computer, which transforms the authorization response message to include the token and sends the transformed authorization response message to the resource provider computer.

3. The method of claim 2, wherein the user device provides the token to the resource provider computer to request access to a resource offered by a resource provider, and wherein the resource provider determines whether or not to grant access based on the transformed authorization response message.

4. The method of claim 1, wherein the authorization request message is in a first format and the transformed authorization request message is in a second format.

5. The method of claim 4, wherein the first format is a JSON data format and the second format is an ISO 8583 message format.

6. The method of claim 1, wherein the authorization request message further comprises a value for an interaction.

7. The method of claim 6, wherein the user device is a mobile phone.

8. The method of claim 6, wherein the token is valid for a certain volume of interactions.

9. The method of claim 8, wherein the storage application stores data.

10. The method of claim 1, wherein the user identifier has a different format than the token.

11. A server computer comprising:
a processor; and
a computer readable medium comprising code, executable by the processor for implementing a method comprising:
receiving from a storage application server computer, a token request message comprising a user identifier associated with a storage application on a user device;
determining a token, wherein the token is a limited use token;
mapping the token to the user identifier;
transmitting a token response message comprising the token to the storage application server computer, which provides the token to the storage application on the user device;
receiving from a processing network computer, a de-tokenization request message comprising the token, after the processing network computer receives an authorization request message comprising the token from a resource provider computer;
determining the user identifier using the token; and
transmitting the user identifier to the processing network computer, wherein the processing network computer transforms the authorization request message and sends the transformed authorization request message to the storage application server computer for authorization.

12. The server computer of claim 11, the method further comprising:

receiving from the processing network computer, a re-tokenization request message, after the processing network computer receives an authorization response message comprising the user identifier from the storage application server computer;

determining the token using the user identifier; and transmitting, the token to the processing network computer, which transforms the authorization response message to include the token and sends the transformed authorization response message to the resource provider computer.

13. The server computer of claim 12, wherein the user device provides the token to the resource provider computer to request access to a resource offered by a resource provider operating the resource provieder computer, and wherein the authorizing entity computer determines whether or not to grant access based on the transformed authorization response message.

14. The server computer of claim 11, wherein the authorization request message is in a first format and the transformed authorization request message is in a second format.

15. The server computer of claim 14, wherein the first format is a JSON data format and the second format is an ISO 8583 message format.

16. A method comprising:

receiving, by a token service computer from a service provider computer, a temporary user identifier request message comprising a token or a credential associated with a service provider application on a user device;

determining, by the token service computer, a temporary user identifier, wherein the temporary user identifier is formatted for processing by the service provider computer, the service provider computer associated with the service provider application;

mapping, by the token service computer, the token to the temporary user identifier;

transmitting, by the token service computer, a temporary user identifier response message comprising the temporary user identifier to (i) the service provider computer, which provides the temporary user identifier to the service provider application on the user device or (ii) a storage application server computer;

receiving, by the token service computer from a processing network computer, a temporary user identifier resolve request message comprising the temporary user identifier, after the processing network computer receives an authorization request message comprising the temporary user identifier from the user device via the storage application server computer;

determining, by the token service computer, the token or credential using the temporary user identifier; and transmitting, by the token service computer, the token or the credential to the processing network computer, wherein the processing network computer transforms the authorization request message and sends the transformed authorization request message to an authorizing entity computer for authorization.

17. The method of claim 16, wherein the authorization request message further comprises a value for an interaction and the transformed authorization request message comprises the token or credential and the value for the interaction.

18. The method of claim 17, wherein the user device is a mobile phone.

19. The method of claim 16, wherein the temporary user identifier response message comprising the temporary user identifier is transmitted to the storage application server computer.

20. The method of claim 16, wherein the temporary user identifier response message comprising the temporary user identifier is transmitted to the service provider computer.

* * * * *